(12) United States Patent
Payne et al.

(10) Patent No.: US 6,801,354 B1
(45) Date of Patent: Oct. 5, 2004

(54) 2-D DIFFRACTION GRATING FOR SUBSTANTIALLY ELIMINATING POLARIZATION DEPENDENT LOSSES

(75) Inventors: Alexander Payne, Ben Lomond, CA (US); Gregory Miller, Foster City, CA (US)

(73) Assignee: Silicon Light Machines, Inc., San Jose, CA (US)

( * ) Notice: Subject to any disclaimer, the term of this patent is extended or adjusted under 35 U.S.C. 154(b) by 24 days.

(21) Appl. No.: 10/225,211

(22) Filed: Aug. 20, 2002

(51) Int. Cl.[7] .......................... G02B 26/00; G02B 5/18; G02B 6/34
(52) U.S. Cl. .................. 359/291; 359/290; 359/295; 359/569; 359/572; 359/573; 385/37
(58) Field of Search ................. 359/290, 291, 359/292, 293, 295, 298, 231, 233, 569, 572, 573; 385/19, 37, 140, 901

(56) References Cited

U.S. PATENT DOCUMENTS

| 1,525,550 A | 2/1925 | Jenkins |
| 1,548,262 A | 8/1925 | Freedman |
| RE16,767 E | 10/1927 | Jenkins |

(List continued on next page.)

FOREIGN PATENT DOCUMENTS

| DE | 32 33 195 A1 | 3/1983 | ............ H01L/23/52 |
| DE | 43 23 799 A1 | 1/1994 | ............ H01L/23/50 |
| DE | 197 23 618 A1 | 12/1997 | ............. G03F/1/14 |
| DE | 197 51 716 A1 | 5/1998 | ............ G02B/27/14 |
| DE | 198 46 532 C1 | 10/1998 | ............ G02B/27/09 |
| EP | 0 089 044 A2 | 9/1983 | ............ H01L/23/10 |
| EP | 0 261 901 A2 | 3/1988 | ............. G09G/3/36 |
| EP | 0 314 437 A1 | 10/1988 | ............ H01L/25/08 |
| EP | 0 304 263 A2 | 2/1989 | ......... H01L/25/065 |
| EP | 0 306 308 A2 | 3/1989 | ............ H04N/3/14 |
| EP | 0 322 714 A2 | 7/1989 | ............ G02B/5/30 |
| EP | 0 627 644 A3 | 9/1990 | ........... G02B/27/00 |
| EP | 0 417 039 A1 | 3/1991 | ........... G03B/21/20 |
| EP | 0 423 513 A2 | 4/1991 | ........... H01S/3/085 |
| EP | 0 436 738 A1 | 7/1991 | ............ H04N/5/74 |

(List continued on next page.)

OTHER PUBLICATIONS

Harold, Winters, "Etch products from the reaction of XeF2 with SiO2, Si3N4, SiC, and Si in the presence of Ion Bombardment," IBM Research Laboratory, 1983 American Vacuum Society, pp. 927–931.

(List continued on next page.)

*Primary Examiner*—Loha Ben
(74) *Attorney, Agent, or Firm*—Okamoto & Benedicto LLP

(57) ABSTRACT

A 2D diffraction grating light valve modulates an incident beam of light. A plurality of elements each have a reflective surface with their respective reflective surfaces substantially coplanar. Alternatively, the reflective surfaces of the plurality of elements lie within one or more parallel planes. The elements are supported in relation to one another. Preferably, a planar member includes a plurality of holes arranged in a symmetrical two-dimensional array and configured such that the holes substantially optically extend the elements. Alternatively, one or more elements substantially optically extends the plurality of holes. The planar member includes a light reflective planar surface that is parallel to the plane of the elements within a functional area of the device. The planar member is supported in relation to the elements. By applying an appropriate biasing voltage to the planar member, the planar member can be moved in a direction normal to the plane of the elements. When the planar member and the plurality of elements are in a first configuration, the 2D diffraction grating reflects the incident beam of light as a plane mirror. When the planar member and the plurality of elements are in a second configuration, the 2D diffraction grating diffract the incident beam of light. Preferably, the planar member is a membrane circumferentially coupled to a support structure.

20 Claims, 6 Drawing Sheets

U.S. PATENT DOCUMENTS

| | | | |
|---|---|---|---|
| 1,814,701 A | 7/1931 | Ives | |
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/1.1 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |

| Patent No. | Date | Inventor | Class |
|---|---|---|---|
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe et al. | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |

| | | | | | | |
|---|---|---|---|---|---|---|
| 5,144,472 A | 9/1992 | Sang, Jr. et al. ............. 359/254 | | 5,237,340 A | 8/1993 | Nelson ..................... 346/108 |
| 5,147,815 A | 9/1992 | Casto ......................... 437/51 | | 5,237,435 A | 8/1993 | Kurematsu et al. ........... 359/41 |
| 5,148,157 A | 9/1992 | Florence .................... 340/783 | | 5,239,448 A | 8/1993 | Perkins et al. .............. 361/764 |
| 5,148,506 A | 9/1992 | McDonald .................. 385/16 | | 5,239,806 A | 8/1993 | Maslakow ................... 53/432 |
| 5,149,405 A | 9/1992 | Bruns et al. ............. 204/129.1 | | 5,240,818 A | 8/1993 | Mignardi et al. ........... 430/321 |
| 5,150,205 A | 9/1992 | Um et al. .................... 358/60 | | 5,245,686 A | 9/1993 | Faris et al. ................ 385/120 |
| 5,151,718 A | 9/1992 | Nelson ..................... 346/160 | | 5,247,180 A | 9/1993 | Mitcham et al. ......... 250/492.1 |
| 5,151,724 A | 9/1992 | Kikinis ....................... 357/17 | | 5,247,593 A | 9/1993 | Lin et al. ................... 385/17 |
| 5,151,763 A | 9/1992 | Marek et al. ................ 357/26 | | 5,249,245 A | 9/1993 | Lebby et al. ................ 385/89 |
| 5,153,770 A | 10/1992 | Harris ...................... 359/245 | | 5,251,057 A | 10/1993 | Guerin et al. .............. 359/249 |
| 5,155,604 A | 10/1992 | Miekka et al. ................ 359/2 | | 5,251,058 A | 10/1993 | MacArthur ................ 359/249 |
| 5,155,615 A | 10/1992 | Tagawa ..................... 359/213 | | 5,254,980 A | 10/1993 | Hendrix et al. .............. 345/84 |
| 5,155,778 A | 10/1992 | Magel et al. ................. 385/18 | | 5,255,100 A | 10/1993 | Urbanus .................... 358/231 |
| 5,155,812 A | 10/1992 | Ehlig et al. ................. 395/275 | | 5,256,869 A | 10/1993 | Lin et al. ................ 250/201.9 |
| 5,157,304 A | 10/1992 | Kane et al. ................. 313/495 | | 5,258,325 A | 11/1993 | Spitzer et al. ................ 437/86 |
| 5,159,485 A | 10/1992 | Nelson ...................... 359/291 | | 5,260,718 A | 11/1993 | Rommelmann et al. 346/107 R |
| 5,161,042 A | 11/1992 | Hamada ...................... 359/41 | | 5,260,798 A | 11/1993 | Um et al. ................... 358/233 |
| 5,162,787 A | 11/1992 | Thompson et al. ......... 340/794 | | 5,262,000 A | 11/1993 | Welbourn et al. ........... 156/643 |
| 5,164,019 A | 11/1992 | Sinton ....................... 136/249 | | 5,272,473 A | 12/1993 | Thompson et al. ............. 345/7 |
| 5,165,013 A | 11/1992 | Faris ......................... 395/104 | | 5,278,652 A | 1/1994 | Urbanus et al. ............. 358/160 |
| 5,168,401 A | 12/1992 | Endriz ...................... 359/625 | | 5,278,925 A | 1/1994 | Boysel et al. ................. 385/14 |
| 5,168,406 A | 12/1992 | Nelson ...................... 359/855 | | 5,280,277 A | 1/1994 | Hornbeck .................. 345/108 |
| 5,170,156 A | 12/1992 | DeMond et al. ............ 340/794 | | 5,281,887 A | 1/1994 | Engle ......................... 310/335 |
| 5,170,269 A | 12/1992 | Lin et al. ........................ 359/9 | | 5,281,957 A | 1/1994 | Schoolman .................... 345/8 |
| 5,170,283 A | 12/1992 | O'Brien et al. ............. 359/291 | | 5,285,105 A | 2/1994 | Cain .......................... 257/672 |
| 5,172,161 A | 12/1992 | Nelson ...................... 355/200 | | 5,285,196 A | 2/1994 | Gale, Jr. ..................... 345/108 |
| 5,172,262 A | 12/1992 | Hornbeck ................... 359/223 | | 5,285,407 A | 2/1994 | Gale et al. ............. 365/189.11 |
| 5,177,724 A | 1/1993 | Gelbart ................... 369/44.16 | | 5,287,096 A | 2/1994 | Thompson et al. ......... 345/147 |
| 5,178,728 A | 1/1993 | Boysel et al. .............. 156/656 | | 5,287,215 A | 2/1994 | Warde et al. ................ 359/293 |
| 5,179,274 A | 1/1993 | Sampsell ................ 250/208.2 | | 5,289,172 A | 2/1994 | Gale, Jr. et al. ............. 345/108 |
| 5,179,367 A | 1/1993 | Shimizu .................... 340/700 | | 5,291,317 A | 3/1994 | Newswanger ................ 359/15 |
| 5,181,231 A | 1/1993 | Parikh et al. ................. 377/26 | | 5,291,473 A | 3/1994 | Pauli .......................... 369/112 |
| 5,182,665 A | 1/1993 | O'Callaghan et al. ........ 359/95 | | 5,293,511 A | 3/1994 | Poradish et al. ............. 257/434 |
| 5,185,660 A | 2/1993 | Um ............................. 358/60 | | 5,296,408 A | 3/1994 | Wilbarg et al. .............. 437/203 |
| 5,188,280 A | 2/1993 | Nakao et al. ................ 228/123 | | 5,296,891 A | 3/1994 | Vogt et al. .................... 355/67 |
| 5,189,404 A | 2/1993 | Masimo et al. ............. 340/720 | | 5,296,950 A | 3/1994 | Lin et al. ........................ 359/9 |
| 5,189,505 A | 2/1993 | Bartelink ................... 257/419 | | 5,298,460 A | 3/1994 | Nishiguchi et al. .......... 437/183 |
| 5,191,405 A | 3/1993 | Tomita et al. ............... 257/777 | | 5,299,037 A | 3/1994 | Sakata ......................... 359/41 |
| 5,192,864 A | 3/1993 | McEwen et al. ............ 250/234 | | 5,299,289 A | 3/1994 | Omae et al. .................. 359/95 |
| 5,192,946 A | 3/1993 | Thompson et al. ......... 340/794 | | 5,300,813 A | 4/1994 | Joshi et al. .................. 257/752 |
| 5,198,895 A | 3/1993 | Vick .......................... 358/103 | | 5,301,062 A | 4/1994 | Takahashi et al. ........... 359/567 |
| D334,557 S | 4/1993 | Hunter et al. .............. D14/114 | | 5,303,043 A | 4/1994 | Glenn .......................... 348/40 |
| D334,742 S | 4/1993 | Hunter et al. .............. D14/113 | | 5,303,055 A | 4/1994 | Hendrix et al. ............. 348/761 |
| 5,202,785 A | 4/1993 | Nelson ...................... 359/214 | | 5,307,056 A | 4/1994 | Urbanus .................... 340/189 |
| 5,206,629 A | 4/1993 | DeMond et al. ............ 340/719 | | 5,307,185 A | 4/1994 | Jones et al. ................... 359/41 |
| 5,208,818 A | 5/1993 | Gelbart et al. ................ 372/30 | | 5,310,624 A | 5/1994 | Ehrlich ...................... 430/322 |
| 5,208,891 A | 5/1993 | Prysner ...................... 385/116 | | 5,311,349 A | 5/1994 | Anderson et al. ........... 359/223 |
| 5,210,637 A | 5/1993 | Puzey ........................ 359/263 | | 5,311,360 A | 5/1994 | Bloom et al. ................ 359/572 |
| 5,212,115 A | 5/1993 | Cho et al. ................... 437/208 | | 5,312,513 A | 5/1994 | Florence et al. ............. 156/643 |
| 5,212,555 A | 5/1993 | Stoltz ........................ 358/206 | | 5,313,479 A | 5/1994 | Florence ..................... 372/26 |
| 5,212,582 A | 5/1993 | Nelson ...................... 359/224 | | 5,313,648 A | 5/1994 | Ehlig et al. .................. 395/800 |
| 5,214,308 A | 5/1993 | Nishiguchi et al. .......... 257/692 | | 5,313,835 A | 5/1994 | Dunn .......................... 73/505 |
| 5,214,419 A | 5/1993 | DeMond et al. ............ 340/794 | | 5,315,418 A | 5/1994 | Sprague et al. ............... 359/41 |
| 5,214,420 A | 5/1993 | Thompson et al. ......... 340/795 | | 5,315,423 A | 5/1994 | Hong ......................... 359/124 |
| 5,216,537 A | 6/1993 | Hornbeck ................... 359/291 | | 5,315,429 A | 5/1994 | Abramov .................... 359/224 |
| 5,216,544 A | 6/1993 | Horikawa et al. ........... 359/622 | | 5,319,214 A | 6/1994 | Gregory et al. ......... 250/504 R |
| 5,219,794 A | 6/1993 | Satoh et al. ................ 437/209 | | 5,319,668 A | 6/1994 | Luecke ....................... 372/107 |
| 5,220,200 A | 6/1993 | Blanton ..................... 257/778 | | 5,319,789 A | 6/1994 | Ehlig et al. .................. 395/800 |
| 5,221,400 A | 6/1993 | Staller et al. ................ 156/292 | | 5,319,792 A | 6/1994 | Ehlig et al. .................. 395/800 |
| 5,221,982 A | 6/1993 | Faris ........................... 359/93 | | 5,321,416 A | 6/1994 | Bassett et al. ................... 345/8 |
| 5,224,088 A | 6/1993 | Atiya .......................... 369/97 | | 5,323,002 A | 6/1994 | Sampsell et al. ......... 250/252.1 |
| D337,320 S | 7/1993 | Hunter et al. .............. D14/113 | | 5,323,051 A | 6/1994 | Adams et al. ............... 257/417 |
| 5,226,099 A | 7/1993 | Mignardi et al. ............ 385/19 | | 5,325,116 A | 6/1994 | Sampsell .................... 346/108 |
| 5,229,597 A | 7/1993 | Fukatsu .................. 250/208.2 | | 5,327,286 A | 7/1994 | Sampsell et al. ............ 359/561 |
| 5,230,005 A | 7/1993 | Rubino et al. ................ 372/20 | | 5,329,289 A | 7/1994 | Sakamoto et al. ........... 345/126 |
| 5,231,363 A | 7/1993 | Sano et al. .................. 332/109 | | 5,330,301 A | 7/1994 | Brancher .................... 414/417 |
| 5,231,388 A | 7/1993 | Stoltz ........................ 340/783 | | 5,330,878 A | 7/1994 | Nelson ...................... 430/311 |
| 5,231,432 A | 7/1993 | Glenn .......................... 353/31 | | 5,331,454 A | 7/1994 | Hornbeck ................... 359/224 |
| 5,233,456 A | 8/1993 | Nelson ...................... 359/214 | | 5,334,991 A | 8/1994 | Wells et al. .................... 345/8 |
| 5,233,460 A | 8/1993 | Partlo et al. ................ 359/247 | | 5,339,116 A | 8/1994 | Urbanus et al. ............. 348/716 |
| 5,233,874 A | 8/1993 | Putty et al. .............. 73/517 AV | | 5,339,177 A | 8/1994 | Jenkins et al. ................ 359/35 |

| Patent No. | | Date | Inventor | Class |
|---|---|---|---|---|
| 5,340,772 | A | 8/1994 | Rosotker | 437/226 |
| 5,345,521 | A | 9/1994 | McDonald et al. | 385/19 |
| 5,347,321 | A | 9/1994 | Gove | 348/663 |
| 5,347,378 | A | 9/1994 | Handschy et al. | 359/53 |
| 5,347,433 | A | 9/1994 | Sedlmayr | 362/32 |
| 5,348,619 | A | 9/1994 | Bohannon et al. | 156/664 |
| 5,349,687 | A | 9/1994 | Ehlig et al. | 395/800 |
| 5,351,052 | A | 9/1994 | D'Hont et al. | 342/42 |
| 5,352,926 | A | 10/1994 | Andrews | 257/717 |
| 5,354,416 | A | 10/1994 | Okudaira et al. | 156/643 |
| 5,357,369 | A | 10/1994 | Pilling et al. | 359/462 |
| 5,357,803 | A | 10/1994 | Lane | 73/517 B |
| 5,359,349 | A | 10/1994 | Jambor et al. | 345/168 |
| 5,359,451 | A | 10/1994 | Gelbart et al. | 359/285 |
| 5,361,131 | A | 11/1994 | Tekemori et al. | 356/355 |
| 5,363,220 | A | 11/1994 | Kuwayama et al. | 359/3 |
| 5,365,283 | A | 11/1994 | Doherty et al. | 348/743 |
| 5,367,585 | A | 11/1994 | Ghezzo et al. | 385/23 |
| 5,370,742 | A | 12/1994 | Mitchell et al. | 134/10 |
| 5,371,543 | A | 12/1994 | Anderson | 348/270 |
| 5,371,618 | A | 12/1994 | Tai et al. | 359/53 |
| 5,377,705 | A | 1/1995 | Smith, Jr. et al. | 134/95.3 |
| 5,382,961 | A | 1/1995 | Gale, Jr. | 345/108 |
| 5,387,924 | A | 2/1995 | Gale, Jr. et al. | 345/108 |
| 5,389,182 | A | 2/1995 | Mignardi | 156/344 |
| 5,391,881 | A | 2/1995 | Jeuch et al. | 250/370.09 |
| 5,392,140 | A | 2/1995 | Ezra et al. | 359/41 |
| 5,392,151 | A | 2/1995 | Nelson | 359/223 |
| 5,394,303 | A | 2/1995 | Yamaji | 361/749 |
| 5,398,071 | A | 3/1995 | Gove et al. | 348/558 |
| 5,399,898 | A | 3/1995 | Rostoker | 257/499 |
| 5,404,365 | A | 4/1995 | Hiiro | 372/27 |
| 5,404,485 | A | 4/1995 | Ban | 395/425 |
| 5,408,123 | A | 4/1995 | Murai | 257/531 |
| 5,410,315 | A | 4/1995 | Huber | 342/42 |
| 5,411,769 | A | 5/1995 | Hornbeck | 427/534 |
| 5,412,186 | A | 5/1995 | Gale | 219/679 |
| 5,412,501 | A | 5/1995 | Fisli | 359/286 |
| 5,418,584 | A | 5/1995 | Larson | 353/122 |
| 5,420,655 | A | 5/1995 | Shimizu | 353/33 |
| 5,420,722 | A | 5/1995 | Bielak | 359/708 |
| 5,426,072 | A | 6/1995 | Finnila | 437/208 |
| 5,427,975 | A | 6/1995 | Sparks et al. | 437/79 |
| 5,430,524 | A | 7/1995 | Nelson | 355/200 |
| 5,435,876 | A | 7/1995 | Alfaro et al. | 156/247 |
| 5,438,477 | A | 8/1995 | Pasch | 361/689 |
| 5,439,731 | A | 8/1995 | Li et al. | 428/209 |
| 5,442,411 | A | 8/1995 | Urbanus et al. | 348/771 |
| 5,442,414 | A | 8/1995 | Janssen et al. | 353/98 |
| 5,444,566 | A | 8/1995 | Gale et al. | 359/291 |
| 5,445,559 | A | 8/1995 | Gale et al. | 451/388 |
| 5,446,479 | A | 8/1995 | Thompson et al. | 345/139 |
| 5,447,600 | A | 9/1995 | Webb | 216/2 |
| 5,448,314 | A | 9/1995 | Heimbuch et al. | 348/743 |
| 5,448,546 | A | 9/1995 | Pauli | 369/112 |
| 5,450,088 | A | 9/1995 | Meier et al. | 342/51 |
| 5,450,219 | A | 9/1995 | Gold et al. | 359/40 |
| 5,451,103 | A | 9/1995 | Hatanaka et al. | 353/31 |
| 5,452,024 | A | 9/1995 | Sampsell | 348/755 |
| 5,452,138 | A | 9/1995 | Mignardi et al. | 359/855 |
| 5,453,747 | A | 9/1995 | D'Hont et al. | 342/42 |
| 5,453,778 | A | 9/1995 | Venkateswar et al. | 347/239 |
| 5,453,803 | A | 9/1995 | Shapiro et al. | 353/119 |
| 5,454,160 | A | 10/1995 | Nickel | 29/840 |
| 5,454,906 | A | 10/1995 | Baker et al. | 216/66 |
| 5,455,445 | A | 10/1995 | Kurtz et al. | 257/419 |
| 5,455,455 | A | 10/1995 | Badehi | 257/690 |
| 5,455,602 | A | 10/1995 | Tew | 347/239 |
| 5,457,493 | A | 10/1995 | Leddy et al. | 348/164 |
| 5,457,566 | A | 10/1995 | Sampsell et al. | 359/292 |
| 5,457,567 | A | 10/1995 | Shinohara | 359/305 |
| 5,458,716 | A | 10/1995 | Alfaro et al. | 156/245 |
| 5,459,492 | A | 10/1995 | Venkateswar | 347/253 |
| 5,459,528 | A | 10/1995 | Pettitt | 348/568 |
| 5,459,592 | A | 10/1995 | Shibatani et al. | 359/40 |
| 5,459,610 | A | 10/1995 | Bloom et al. | 359/572 |
| 5,461,197 | A | 10/1995 | Hiruta et al. | 174/52.4 |
| 5,461,410 | A | 10/1995 | Venkateswar et al. | 347/240 |
| 5,461,411 | A | 10/1995 | Florence et al. | 347/240 |
| 5,461,547 | A | 10/1995 | Ciupke et al. | 362/31 |
| 5,463,347 | A | 10/1995 | Jones et al. | 330/253 |
| 5,463,497 | A | 10/1995 | Muraki et al. | 359/618 |
| 5,465,175 | A | 11/1995 | Woodgate et al. | 359/463 |
| 5,467,106 | A | 11/1995 | Salomon | 345/87 |
| 5,467,138 | A | 11/1995 | Gove | 348/452 |
| 5,467,146 | A | 11/1995 | Huang et al. | 348/743 |
| 5,469,302 | A | 11/1995 | Lim | 359/846 |
| 5,471,341 | A | 11/1995 | Warde et al. | 359/293 |
| 5,473,512 | A | 12/1995 | Degani et al. | 361/760 |
| 5,475,236 | A | 12/1995 | Yoshizaki | 257/48 |
| 5,480,839 | A | 1/1996 | Ezawa et al. | 437/209 |
| 5,481,118 | A | 1/1996 | Tew | 250/551 |
| 5,481,133 | A | 1/1996 | Hsu | 257/621 |
| 5,482,564 | A | 1/1996 | Douglas et al. | 134/18 |
| 5,482,818 | A | 1/1996 | Nelson | 430/394 |
| 5,483,307 | A | 1/1996 | Anderson | 353/98 |
| 5,485,172 | A | 1/1996 | Sawachika et al. | 345/8 |
| 5,485,304 | A | 1/1996 | Kaeriyama | 359/291 |
| 5,485,354 | A | 1/1996 | Ciupke et al. | 362/31 |
| 5,486,698 | A | 1/1996 | Hanson et al. | 250/332 |
| 5,486,841 | A | 1/1996 | Hara et al. | 345/8 |
| 5,486,946 | A | 1/1996 | Jachimowicz et al. | 359/263 |
| 5,488,431 | A | 1/1996 | Gove et al. | 348/716 |
| 5,489,952 | A | 2/1996 | Gove et al. | 348/771 |
| 5,490,009 | A | 2/1996 | Venkateswar et al. | 359/291 |
| 5,491,510 | A | 2/1996 | Gove | 348/77 |
| 5,491,612 | A | 2/1996 | Nicewarner, Jr. | 361/760 |
| 5,491,715 | A | 2/1996 | Flaxl | 375/344 |
| 5,493,177 | A | 2/1996 | Muller et al. | 313/578 |
| 5,493,439 | A | 2/1996 | Engle | 359/292 |
| 5,497,172 | A | 3/1996 | Doherty et al. | 345/85 |
| 5,497,197 | A | 3/1996 | Gove et al. | 348/388 |
| 5,497,262 | A | 3/1996 | Kaeriyama | 359/223 |
| 5,499,060 | A | 3/1996 | Gove et al. | 348/651 |
| 5,499,062 | A | 3/1996 | Urbanus | 348/771 |
| 5,500,761 | A | 3/1996 | Goossen et al. | 359/290 |
| 5,502,481 | A | 3/1996 | Dentinger et al. | 348/51 |
| 5,504,504 | A | 4/1996 | Markandey et al. | 345/214 |
| 5,504,514 | A | 4/1996 | Nelson | 347/130 |
| 5,504,575 | A | 4/1996 | Stafford | 356/330 |
| 5,504,614 | A | 4/1996 | Webb et al. | 359/223 |
| 5,506,171 | A | 4/1996 | Leonard et al. | 437/187 |
| 5,506,597 | A | 4/1996 | Thompson et al. | 345/85 |
| 5,506,720 | A | 4/1996 | Yoon | 359/224 |
| 5,508,558 | A | 4/1996 | Robinette, Jr. et al. | 257/700 |
| 5,508,561 | A | 4/1996 | Tago et al. | 257/737 |
| 5,508,565 | A | 4/1996 | Hatakeyama et al. | 257/777 |
| 5,508,750 | A | 4/1996 | Hewlett et al. | 348/558 |
| 5,508,840 | A | 4/1996 | Vogel et al. | 359/291 |
| 5,508,841 | A | 4/1996 | Lin et al. | 359/318 |
| 5,510,758 | A | 4/1996 | Fujita et al. | 333/247 |
| 5,510,824 | A | 4/1996 | Nelson | 347/239 |
| 5,512,374 | A | 4/1996 | Wallace et al. | 428/422 |
| 5,512,748 | A | 4/1996 | Hanson | 250/332 |
| 5,515,076 | A | 5/1996 | Thompson et al. | 345/139 |
| 5,516,125 | A | 5/1996 | McKenna | 279/3 |
| 5,517,340 | A | 5/1996 | Doany et al. | 359/41 |
| 5,517,347 | A | 5/1996 | Sampsell | 359/224 |
| 5,517,357 | A | 5/1996 | Shibayama | 359/547 |
| 5,517,359 | A | 5/1996 | Gelbart | 359/623 |
| 5,519,251 | A | 5/1996 | Sato et al. | 257/666 |
| 5,519,450 | A | 5/1996 | Urbanus et al. | 348/600 |

| | | | | | | | |
|---|---|---|---|---|---|---|---|
| 5,521,748 A | 5/1996 | Sarraf | 359/321 | 5,903,243 A | 5/1999 | Jones | 345/7 |
| 5,523,619 A | 6/1996 | McAllister et al. | 257/686 | 5,903,395 A | 5/1999 | Rallison et al. | 359/630 |
| 5,523,628 A | 6/1996 | Williams et al. | 257/777 | 5,904,737 A | 5/1999 | Preston et al. | 8/158 |
| 5,523,803 A | 6/1996 | Urbanus et al. | 348/771 | 5,910,856 A | 6/1999 | Ghosh et al. | 359/291 |
| 5,523,878 A | 6/1996 | Wallace et al. | 359/290 | 5,912,094 A | 6/1999 | Aksyuk et al. | 430/5 |
| 5,523,881 A | 6/1996 | Florence et al. | 359/561 | 5,912,608 A | 6/1999 | Asada | 335/222 |
| 5,523,920 A | 6/1996 | Machuga et al. | 381/767 | 5,914,801 A | 6/1999 | Dhuler et al. | 359/230 |
| 5,524,155 A | 6/1996 | Weaver | 385/24 | 5,915,168 A | 6/1999 | Salatino et al. | 438/110 |
| 5,526,834 A | 6/1996 | Mielnik et al. | 134/105 | 5,919,548 A | 7/1999 | Barron et al. | 428/138 |
| 5,534,107 A | 7/1996 | Gray et al. | 156/643.1 | 5,920,411 A | 7/1999 | Duck et al. | 359/127 |
| 5,534,883 A | 7/1996 | Koh | 345/3 | 5,920,418 A | 7/1999 | Shiono et al. | 359/246 |
| 5,539,422 A | 7/1996 | Heacock et al. | 345/8 | 5,923,475 A | 7/1999 | Kurtz et al. | 359/619 |
| 5,544,306 A | 8/1996 | Deering et al. | 395/164 | 5,926,309 A | 7/1999 | Little | 359/293 |
| 5,554,304 A | 9/1996 | Suzuki | 216/2 | 5,926,318 A | 7/1999 | Hebert | 359/618 |
| 5,576,878 A | 11/1996 | Henck | 359/224 | 5,942,791 A | 8/1999 | Shorrocks et al. | 257/522 |
| 5,602,671 A | 2/1997 | Hornbeck | 359/224 | 5,949,390 A | 9/1999 | Nomura et al. | 345/32 |
| 5,606,181 A | 2/1997 | Sakuma et al. | 257/88 | 5,949,570 A * | 9/1999 | Shiono et al. | 359/291 |
| 5,606,447 A | 2/1997 | Asada et al. | 359/199 | 5,953,161 A | 9/1999 | Troxell et al. | 359/618 |
| 5,610,438 A | 3/1997 | Wallace et al. | 257/682 | 5,955,771 A | 9/1999 | Kurtz et al. | 257/419 |
| 5,623,361 A | 4/1997 | Engle | 359/291 | 5,963,788 A | 10/1999 | Barron et al. | 438/48 |
| 5,629,566 A | 5/1997 | Doi et al. | 257/789 | 5,978,127 A | 11/1999 | Berg | 359/279 |
| 5,629,801 A | 5/1997 | Staker et al. | 359/572 | 5,982,553 A | 11/1999 | Bloom et al. | 359/627 |
| 5,640,216 A | 6/1997 | Hasegawa et al. | 349/58 | 5,986,634 A | 11/1999 | Alioshin | 345/126 |
| 5,658,698 A | 8/1997 | Yagi et al. | 430/11 | 5,986,796 A | 11/1999 | Miles | 359/260 |
| 5,661,592 A | 8/1997 | Bornstein et al. | 359/291 | 5,995,303 A | 11/1999 | Honguh et al. | 359/708 |
| 5,661,593 A | 8/1997 | Engle | 359/292 | 5,999,319 A | 12/1999 | Castracane | 359/573 |
| 5,663,817 A | 9/1997 | Frapin et al. | 349/5 | 6,004,912 A | 12/1999 | Gudeman | 508/577 |
| 5,668,611 A | 9/1997 | Ernstoff et al. | 348/771 | 6,016,222 A | 1/2000 | Setani et al. | 359/571 |
| 5,673,139 A | 9/1997 | Johnson | 359/291 | 6,025,859 A | 2/2000 | Ide et al. | 347/135 |
| 5,677,783 A | 10/1997 | Bloom et al. | 359/224 | 6,038,057 A | 3/2000 | Brazas, Jr. et al. | 359/291 |
| 5,689,361 A | 11/1997 | Damen et al. | 359/284 | 6,040,748 A | 3/2000 | Gueissaz | 335/78 |
| 5,691,836 A | 11/1997 | Clark | 359/247 | 6,046,840 A | 4/2000 | Huibers | 359/291 |
| 5,694,740 A | 12/1997 | Martin et al. | 53/431 | 6,055,090 A | 4/2000 | Miles | 359/291 |
| 5,696,560 A | 12/1997 | Songer | 348/436 | 6,057,520 A | 5/2000 | Goodwin-Johansson | 200/181 |
| 5,699,740 A | 12/1997 | Gelbart | 101/477 | 6,061,166 A * | 5/2000 | Furlani et al. | 359/254 |
| 5,704,700 A | 1/1998 | Kappel et al. | 353/31 | 6,061,489 A | 5/2000 | Ezra et al. | 385/115 |
| 5,707,160 A | 1/1998 | Bowen | 400/472 | 6,062,461 A | 5/2000 | Sparks et al. | 228/123.1 |
| 5,712,649 A | 1/1998 | Tosaki | 345/8 | 6,064,404 A | 5/2000 | Aras et al. | 345/507 |
| 5,713,652 A | 2/1998 | Zavracky et al. | 353/122 | 6,069,392 A | 5/2000 | Tai et al. | 257/419 |
| 5,726,480 A | 3/1998 | Pister | 257/415 | 6,071,652 A | 6/2000 | Feldman et al. | 430/5 |
| 5,731,802 A | 3/1998 | Aras et al. | 345/148 | 6,075,632 A | 6/2000 | Braun | 359/124 |
| 5,734,224 A | 3/1998 | Tagawa et al. | 313/493 | 6,084,626 A | 7/2000 | Ramanujan et al. | 347/239 |
| 5,742,373 A | 4/1998 | Alvelda | 349/204 | 6,088,102 A | 7/2000 | Manhart | 356/354 |
| 5,744,752 A | 4/1998 | McHerron et al. | 174/52.4 | 6,090,717 A | 7/2000 | Powell et al. | 438/710 |
| 5,745,271 A | 4/1998 | Ford et al. | 359/130 | 6,091,521 A | 7/2000 | Popovich | 359/15 |
| 5,757,354 A | 5/1998 | Kawamura | 345/126 | 6,096,576 A | 8/2000 | Corbin et al. | 438/108 |
| 5,757,536 A | 5/1998 | Ricco et al. | 359/224 | 6,097,352 A | 8/2000 | Zavracky et al. | 345/7 |
| 5,764,280 A | 6/1998 | Bloom et al. | 348/53 | 6,101,036 A | 8/2000 | Bloom | 359/567 |
| 5,768,009 A | 6/1998 | Little | 359/293 | 6,115,168 A | 9/2000 | Zhao et al. | 359/247 |
| 5,773,473 A | 6/1998 | Hall et al. | 438/26 | 6,122,299 A | 9/2000 | DeMars et al. | 372/20 |
| 5,793,519 A | 8/1998 | Furlani et al. | 359/291 | 6,123,985 A | 9/2000 | Robinson et al. | 427/162 |
| 5,798,743 A | 8/1998 | Bloom | 345/90 | 6,124,145 A | 9/2000 | Stemme et al. | 438/26 |
| 5,798,805 A | 8/1998 | Ooi et al. | 349/10 | 6,130,770 A | 10/2000 | Bloom | 359/224 |
| 5,801,074 A | 9/1998 | Kim et al. | 438/125 | 6,144,481 A | 11/2000 | Kowarz et al. | 359/291 |
| 5,802,222 A | 9/1998 | Rasch et al. | 385/1 | 6,147,789 A | 11/2000 | Gelbart | 359/231 |
| 5,808,323 A | 9/1998 | Spaeth et al. | 257/88 | 6,154,259 A | 11/2000 | Hargis et al. | 348/756 |
| 5,808,797 A | 9/1998 | Bloom et al. | 359/572 | 6,154,305 A | 11/2000 | Dickensheets et al. | 438/24 |
| 5,815,126 A | 9/1998 | Fan et al. | 345/8 | 6,163,026 A | 12/2000 | Bawolek et al. | 250/351 |
| 5,825,443 A | 10/1998 | Kawasaki et al. | 349/95 | 6,163,402 A | 12/2000 | Chou et al. | 359/443 |
| 5,835,255 A | 11/1998 | Miles | 359/291 | 6,169,624 B1 | 1/2001 | Godil et al. | 359/237 |
| 5,835,256 A | 11/1998 | Huibers | 359/291 | 6,172,796 B1 * | 1/2001 | Kowarz et al. | 359/290 |
| 5,837,562 A | 11/1998 | Cho | 438/51 | 6,172,797 B1 | 1/2001 | Huibers | 359/291 |
| 5,841,579 A | 11/1998 | Bloom et al. | 359/572 | 6,177,980 B1 | 1/2001 | Johnson | 355/67 |
| 5,844,711 A | 12/1998 | Long, Jr. | 359/291 | 6,181,458 B1 * | 1/2001 | Brazas et al. | 359/290 |
| 5,847,859 A | 12/1998 | Murata | 359/201 | 6,188,519 B1 | 2/2001 | Johnson | 359/572 |
| 5,862,164 A | 1/1999 | Hill | 372/27 | 6,195,196 B1 | 2/2001 | Kimura et al. | 359/295 |
| 5,868,854 A | 2/1999 | Kojima et al. | 134/1.3 | 6,197,610 B1 | 3/2001 | Toda | 438/50 |
| 5,886,675 A | 3/1999 | Aye et al. | 345/7 | 6,210,988 B1 | 4/2001 | Howe et al. | 438/50 |
| 5,892,505 A | 4/1999 | Tropper | 345/208 | 6,215,579 B1 | 4/2001 | Bloom et al. | 359/298 |
| 5,895,233 A | 4/1999 | Higashi et al. | 438/107 | 6,219,015 B1 | 4/2001 | Bloom et al. | 345/87 |
| 5,898,515 A | 4/1999 | Furlani et al. | 359/290 | 6,222,954 B1 | 4/2001 | Riza | 385/18 |

| | | | | | | | |
|---|---|---|---|---|---|---|---|
| 6,229,650 B1 | 5/2001 | Reznichenko et al. | 359/566 | GB | 2 296 152 A | 6/1996 | H04N/13/04 |
| 6,229,683 B1 | 5/2001 | Goodwin-Johansson | 361/233 | GB | 2 319 424 A | 5/1998 | H04N/13/04 |
| 6,241,143 B1 | 6/2001 | Kuroda | 228/110.1 | JP | 53-39068 | 4/1978 | H01L/23/12 |
| 6,251,842 B1 | 6/2001 | Gudeman | 508/577 | JP | 55-111151 | 8/1980 | H01L/27/00 |
| 6,252,697 B1 * | 6/2001 | Hawkins et al. | 359/290 | JP | 57-31166 | 2/1982 | H01L/23/48 |
| 6,254,792 B1 | 7/2001 | Van Buskirk et al. | 216/13 | JP | 57-210638 | 12/1982 | H01L/21/60 |
| 6,261,494 B1 | 7/2001 | Zavracky et al. | 264/104 | JP | 60-49638 | 3/1985 | H01L/21/60 |
| 6,268,952 B1 * | 7/2001 | Godil et al. | 359/291 | JP | 60-94756 | 5/1985 | H01L/25/04 |
| 6,271,145 B1 | 8/2001 | Toda | 438/706 | JP | 60-250639 | 12/1985 | H01L/21/58 |
| 6,271,808 B1 | 8/2001 | Corbin | 345/7 | JP | 61-142750 | 6/1986 | H01L/21/60 |
| 6,274,469 B1 | 8/2001 | Yu | 438/592 | JP | 61-145838 | 7/1986 | H01L/21/60 |
| 6,286,231 B1 | 9/2001 | Bergman et al. | 34/410 | JP | 63-234767 | 9/1988 | H04N/1/04 |
| 6,290,859 B1 | 9/2001 | Fleming et al. | 216/2 | JP | 63-305323 | 12/1988 | G02F/1/13 |
| 6,290,864 B1 | 9/2001 | Patel et al. | 216/79 | JP | 1-155637 | 6/1989 | H01L/21/66 |
| 6,300,148 B1 | 10/2001 | Birdsley et al. | 438/15 | JP | 40-1155637 | 6/1989 | H01L/21/92 |
| 6,303,986 B1 | 10/2001 | Shook | 257/680 | JP | 2219092 | 8/1990 | G09G/3/28 |
| 6,310,018 B1 | 10/2001 | Behr et al. | 510/175 | JP | 4-333015 | 11/1992 | G02B/27/18 |
| 6,323,984 B1 | 11/2001 | Trisnadi | 359/245 | JP | 7-281161 | 10/1995 | G02F/1/1333 |
| 6,327,071 B1 | 12/2001 | Kimura | 359/291 | JP | 3288369 | 3/2002 | G02B/26/06 |
| 6,335,831 B2 * | 1/2002 | Kowarz et al. | 359/573 | WO | WO 90/13913 | 11/1990 | H01L/23/10 |
| 6,342,960 B1 | 1/2002 | McCullough | 359/124 | WO | WO 92/12506 | 7/1992 | G09F/9/37 |
| 6,356,577 B1 | 3/2002 | Miller | 372/107 | WO | WO 93/02269 | 2/1993 | E06B/5/10 |
| 6,356,689 B1 | 3/2002 | Greywall | 385/52 | WO | WO 93/09472 | 5/1993 | G03F/7/20 |
| 6,359,333 B1 | 3/2002 | Wood et al. | 257/704 | WO | WO 93/18428 | 9/1993 | G02B/27/00 |
| 6,384,959 B1 | 5/2002 | Furlani et al. | 359/291 | WO | WO 93/22694 | 11/1993 | G02B/5/18 |
| 6,387,723 B1 | 5/2002 | Payne et al. | 438/48 | WO | WO 94/09473 | 4/1994 | G09G/3/34 |
| 6,392,309 B1 | 5/2002 | Wataya et al. | 257/796 | WO | WO 94/29761 | 12/1994 | G02B/27/24 |
| 6,396,789 B1 | 5/2002 | Guerra et al. | 369/112 | WO | WO 95/11473 | 4/1995 | G02B/27/00 |
| 6,421,179 B1 | 7/2002 | Gutin et al. | 359/572 | WO | WO 96/02941 | 2/1996 | H01L/23/02 |
| 6,438,954 B1 | 8/2002 | Goetz et al. | 60/527 | WO | WO 96/08031 | 3/1996 | H01J/29/12 |
| 6,445,502 B1 | 9/2002 | Islam et al. | 359/571 | WO | WO 96/41217 | 12/1996 | G02B/5/18 |
| 6,452,260 B1 | 9/2002 | Corbin et al. | 257/686 | WO | WO 96/41224 | 12/1996 | G02B/19/00 |
| 6,466,354 B1 | 10/2002 | Gudeman | 359/291 | WO | WO 97/22033 | 6/1997 | G02B/27/22 |
| 6,480,634 B1 | 11/2002 | Corrigan | 385/4 | WO | WO 97/26569 | 7/1997 | G02B/5/18 |
| 6,497,490 B1 | 12/2002 | Miller et al. | 359/614 | WO | WO 98/05935 | 2/1998 | G01L/9/06 |
| 6,501,600 B1 * | 12/2002 | Godil et al. | 359/569 | WO | WO 98/24240 | 6/1998 | H04N/9/31 |
| 6,525,863 B1 | 2/2003 | Riza | 359/290 | WO | WO 98/41893 | 9/1998 | G02B/26/08 |
| 6,563,974 B2 | 5/2003 | Agha Riza | 385/18 | WO | WO 99/07146 | 2/1999 | H04N/7/16 |
| 6,565,222 B1 | 5/2003 | Ishii et al. | 359/883 | WO | WO 99/12208 | 3/1999 | H01L/25/065 |
| 2001/0019454 A1 | 9/2001 | Tadic-Gaieb et al. | 359/649 | WO | WO 99/23520 | 5/1999 | G02B/26/08 |
| 2002/0015230 A1 | 2/2002 | Pilossof et al. | 359/558 | WO | WO 99/34484 | 7/1999 | |
| 2002/0021485 A1 | 2/2002 | Pilossof | 359/295 | WO | WO 99/59335 | 11/1999 | H04N/5/765 |
| 2002/0079432 A1 | 6/2002 | Lee et al. | 250/216 | WO | WO 99/63388 | 12/1999 | G02B/27/22 |
| 2002/0105725 A1 | 8/2002 | Sweatt et al. | 359/566 | WO | WO 99/67671 | 12/1999 | G02B/26/08 |
| 2002/0112746 A1 | 8/2002 | DeYoung et al. | 134/36 | WO | WO 00/04718 | 1/2000 | H04N/7/167 |
| 2002/0131230 A1 | 9/2002 | Potter | 361/277 | WO | WO 00/07225 | 2/2000 | H01L/21/00 |
| | | | | WO | WO 01/04674 A1 | 1/2001 | G02B/6/12 |
| FOREIGN PATENT DOCUMENTS | | | | WO | WO 01/006297 A3 | 1/2001 | G02B/27/10 |
| | | | | WO | WO 01/57581 A3 | 8/2001 | G02B/27/48 |
| EP | 0 458 316 A2 | 11/1991 | G06K/11/06 | WO | WO 02/025348 A3 | 3/2002 | G02B/26/02 |
| EP | 0 477 566 A2 | 4/1992 | G02B/26/08 | WO | WO 02/31575 A2 | 4/2002 | G02B/27/00 |
| EP | 0 488 326 A3 | 6/1992 | G09G/3/28 | WO | WO 02/058111 A2 | 7/2002 | |
| EP | 0 499 566 A2 | 8/1992 | G06F/3/033 | WO | WO 02/065184 A3 | 8/2002 | G02B/27/12 |
| EP | 0 528 646 A1 | 2/1993 | G09G/3/02 | WO | WO 02/073286 A2 | 9/2002 | G02B/26/08 |
| EP | 0 530 760 A2 | 3/1993 | G09G/3/34 | WO | WO 02/084375 A1 | 10/2002 | G02B/26/08 |
| EP | 0 550 189 A1 | 7/1993 | G02F/1/315 | WO | WO 02/084397 A3 | 10/2002 | G02B/27/18 |
| EP | 0 610 665 A1 | 8/1994 | G09G/3/34 | WO | WO 03/001281 A1 | 1/2003 | G02F/1/01 |
| EP | 0 627 644 A2 | 12/1994 | G02B/27/00 | WO | WO 03/001716 A1 | 1/2003 | H04J/14/02 |
| EP | 0 627 850 A2 | 12/1994 | H04N/5/64 | WO | WO 03/012523 A1 | 2/2003 | G02B/26/00 |
| EP | 0 643 314 A2 | 3/1995 | G02B/27/00 | WO | WO 03/016965 A1 | 2/2003 | G02B/5/18 |
| EP | 0 654 777 A1 | 5/1995 | G09G/3/34 | WO | WO 03/023849 A1 | 3/2003 | H01L/23/02 |
| EP | 0 658 868 A1 | 6/1995 | G09G/3/34 | WO | WO 03/025628 A2 | 3/2003 | |
| EP | 0 658 830 A1 | 12/1995 | G09G/3/34 | | | | |
| EP | 0 689 078 A1 | 12/1995 | G02B/26/08 | | | | |
| EP | 0 801 319 A1 | 10/1997 | G02B/26/00 | OTHER PUBLICATIONS | | | |
| EP | 0 851 492 A2 | 7/1998 | H01L/23/538 | | | | |
| EP | 1 003 071 A2 | 5/2000 | G03B/27/72 | R.A. Houle, "Dynamics of SiF4 desorption during etching of silicon by XeF2," J. Chem. Phys. 87 (3), Aug. 1, 1987, pp. 1866–1872. | | | |
| EP | 1 014 143 A1 | 6/2000 | G02B/26/08 | | | | |
| EP | 1 040 927 A2 | 10/2000 | B41J/2/455 | | | | |
| GB | 2 117 564 A | 10/1983 | H01L/25/08 | | | | |
| GB | 2 118 365 A | 10/1983 | H01L/27/13 | Mehran Mehregany, "Microelectromechanical Systems," 1993 IEEE, pp. 14–22. | | | |
| GB | 2 266 385 A | 10/1993 | G02B/23/10 | | | | |

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commercial CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M. Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, p. 2–5.

W. Riethmuller et al., "A smart accelerometer with on–chip electronics fabricated by a commercial CMOS process," Sensors and Actuators A. 31, (1992), 121–124.

W. Gopel et al., "Sensors—A Comprehensive Survey," vol. 7, Weinheim New York, 44 pps.

D. E. Ibbotson et al., "Comparison of XeF2 and F–atom reactions with Si and SiO2," 1984 American Institute of Physics, pp. 1129–1131.

D. E. Ibbotson et al., "Plasmaless dry etching of silicon with fluorine–containing compounds," 1984 American Institute of Physics. pp. 2939–2942.

M.H. Hecht et al., "A novel x–ray photoelectron spectroscopy study of the AI/SiO2 interfaces," 1985 American Institute of Physics, pp. 5256–52616.

Daniel L. Flamm et al., "XeF2 and F–Atom Reactions with Si: Their Significance for Plasma Etching," Solid State Technology, v. 26, #4, 4/83, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pps.

J. Marshall et al., "Realizing Suspended Structures on Chips Fabricated by CMOS Foundry Processes Through the MOSIS Service" National Inst. of Standards and Technology, Jun. 94, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi Univeristy, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P.C. Kundu et al., "Reduction of Speckle Noise by Varying the Polarisation of Illuminatin gBeam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford Univeristy, 1976, pp. 1146–1150.

Lingli Wang et al., "Speckle Reduction in Laser Projection Systems by Diffracive Optical Elements" XP–000754330, Applied Optics, Apr. 1, 1998, vol. 37, No. 10, pp. 1770–1775.

R. W. Corrigan et al., "Calibration of a Scanned Linear Grating Light–Valve, Projection System for E–Cinema Applications", Silicon Light Machines, SID'99, San Jose, CA, 27 pgs, 1999.

R. W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/erpto/into.html, 35 pgs, Jun. 21, 1999.

"Deep Sky Black," Equinox Interscience, www.cisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Mircomirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J.A. Walker et al., "Demonstration of a Gain Flattened Optical Amplifier with Micromechanical Equalizer Element", Lucent Technologies, pp. 13–14.

A. P. Payne et al., "Resonance Measurements of Stresses in $Al/Sl_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

D. Rowe, "Laser Beam Scanning," SPIE, vol. 2088, Oct. 5, 1993, 18–26.

E. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Seminconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al., "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electronically Deformable Echellette Grating and its Application to Tunable Laser Resonator," Electronics and Communications in Japan, vol. 63–c, No. 10, pp. 94–100, Japan, 1980.

Burns, D. M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997, pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M.S. Goodman et al., "The Lambdanet Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum— Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Aple et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S. T. Pai, et al., "Electromigration in metals", Received Jun. 4, 1976, p. 103–115.

Olga B. Spahn, et al., "High Optical Power Handling of Pop–Up Microelectromechanical Mirrors", Sanadia National Laboratories, IEEE 2000, p. 51–52.

David M. Burns, et al., "Optical Power Induced Demage to Microelectromechanical Mirrors", Sensors and Actuators A 70, 1998, p. 6–14.

V. S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modulators for Fiber–Optic and Display Applications", Ph.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7$^{th}$ International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al. "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

* cited by examiner

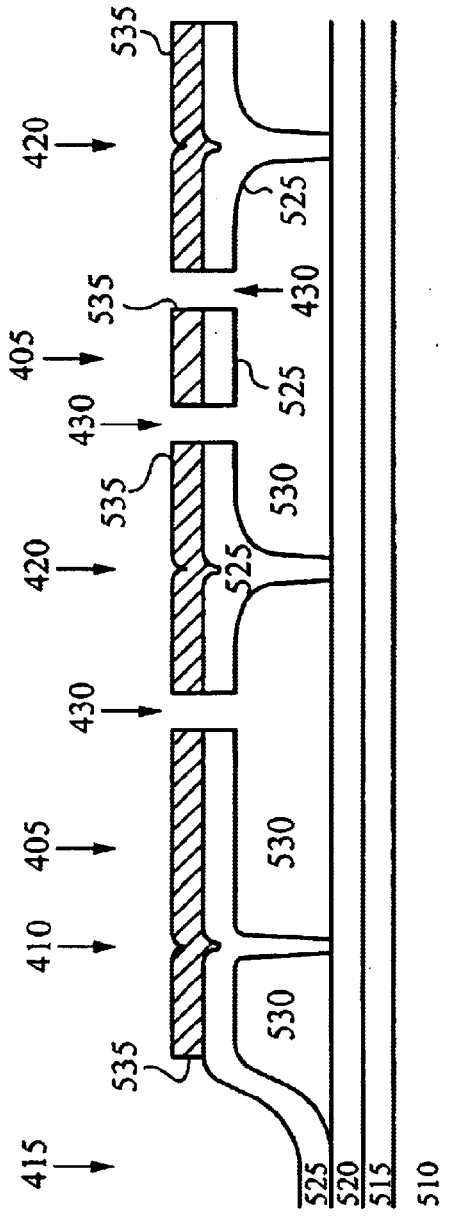
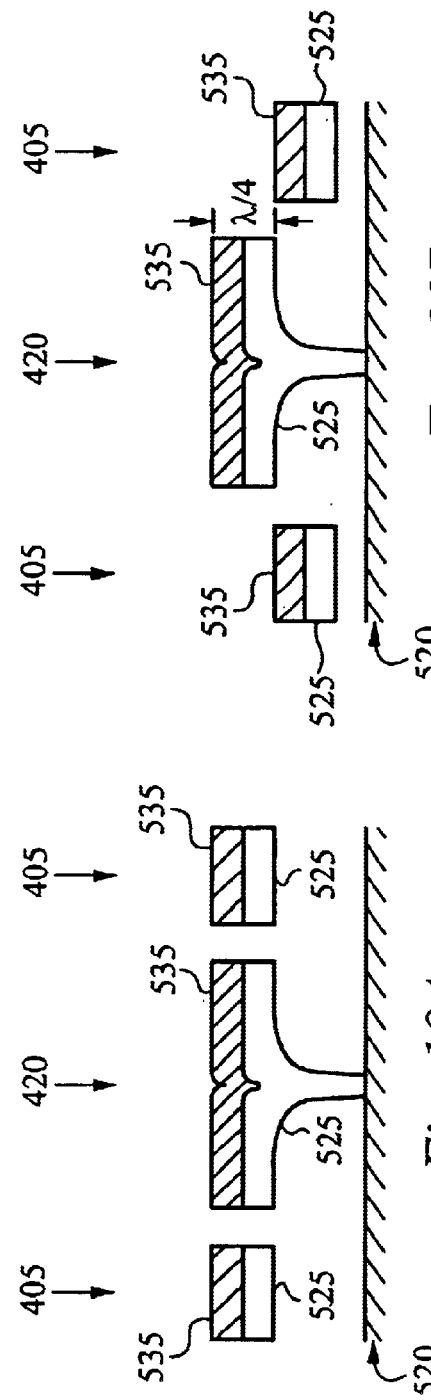
Fig. 9
Fig. 10A
Fig. 10B

2-D DIFFRACTION GRATING FOR SUBSTANTIALLY ELIMINATING POLARIZATION DEPENDENT LOSSES

FIELD OF THE INVENTION

The present invention relates to a method of and an apparatus for modulation of a beam of light. More particularly, this invention is for a substantially flat reflective surface having selectively deformable portions for providing a diffraction grating.

BACKGROUND OF THE INVENTION

Designers and inventors have sought to develop a light modulator which can operate alone or together with other modulators. Such modulators should provide high resolution, high operating speeds (kHz frame rates), multiple gray scale levels, e.g., 100 levels or be compatible with the generation of color, a high contrast ratio or modulation depth, have optical flatness, be compatible with VLSI processing techniques, be easy to handle and be relatively low in cost. One such related system is found in U.S. Pat. No. 5,311,360.

According to the teachings of the '360 patent, a diffraction grating is formed of a multiple mirrored-ribbon structure such as shown in FIG. 1. A pattern of a plurality of deformable ribbon structures 100 are formed in a spaced relationship over a substrate 102. The substrate 102 preferably includes a conductor 101. Both the ribbons and the substrate between the ribbons are coated with a light reflective material 104, such as an aluminum film. The height difference that is designed between the surface of the reflective material 104 on the ribbons 100 and those on the substrate 102 is $\lambda/2$ when the ribbons are in a relaxed, up state. If light at a wavelength $\lambda$ impinges on this structure perpendicularly to the surface of the substrate 102, the reflected light from the surface of the ribbons 100 will be in phase with the reflected light from the substrate 102. This is because the light which strikes the substrate travels $\lambda/2$ further than the light striking the ribbons and then returns $\lambda/2$, for a total of one complete wavelength $\lambda$. Thus, the structure appears as a flat mirror when a beam of light having a wavelength of $\lambda$ impinges thereon.

By applying appropriate voltages to the ribbons 100 and the conductor 101, the ribbons 100 can be made to bend toward and contact the substrate 102 as shown in FIG. 2. The thickness of the ribbons is designed to be $\lambda/4$. If light at a wavelength $\lambda$ impinges on this structure perpendicularly to the surface of the substrate 102, the reflected light from the surface of the ribbons 100 will be completely out of phase with the reflected light from the substrate 102. This will cause interference between the light from the ribbons and light from the substrate and thus, the structure will diffract the light. Because of the diffraction, the reflected light will come from the surface of the structure at an angle $\Theta$ from perpendicular.

If a wavelength of other than $\lambda$ impinges thereon, there will only be partial reflectivity when the ribbons are in the "up"0 state, since $\Theta$ is dependent on the wavelength $\lambda$. Similarly, the light will only be partially diffracted to the angle $\Theta$ when the ribbons are in the "down"0 state. Thus, a dark pixel will display some light and a bright pixel will not display all the light if the wavelength of the light is not exactly at $\lambda$. It is very expensive to utilize a light source that has only a single wavelength. Commercially viable light sources typically provide light over a range of wavelengths.

For the above described device to function within desired parameters requires that the heights and thickness of the ribbons and reflecting layers to provide structures are precisely $\lambda/2$ when up and $\lambda/4$ when down. Because of variances in manufacturing processing, the likelihood is small that the relative heights will be precisely $\lambda/2$ when up and $\lambda/4$ when down. Therefore, the expected parameters will be much poorer than theoretically possible.

Another difficulty with the above described structure results from an artifact of the physical construction. In particular, once in the down position, the ribbons tend to adhere to the substrate. Texturing the surface of the substrate aids in overcoming this adhesion. Unfortunately, the textured surface substantially degrades the reflective properties of the surface. This degrades the performance of the device.

The '360 patent teaches an alternate structure as shown in FIG. 3. According to this conventional structure, a plurality of elongated elements are disposed over a substrate 200. A first plurality of the elongated elements 202 are suspended by their respective ends (not shown) over an air gap 204, as in the embodiment of FIGS. 1 and 2. A second plurality of the elongated elements 206 are mounted to the substrate 200 via a rigid support member 208. The height of the support members 208 is designed to be $\lambda/4$. A reflective material 210 is formed over the surface of all the elongated elements 202 and 206.

In theory, the elongated elements 202 and 206 are designed to be at the same height when at rest. Thus, when all the elongated elements are up and at the same height there will be no diffraction. (In fact there may be some modest amount of diffraction due to the periodic discontinuities of the gaps between elongated elements. However, this period is half the period of the grating so that it diffracts at twice the angle of the desired diffracted light. Because the optics are configured to pick up diffracted light from only the desired angle, this unwanted diffraction is not captured and does not degrade the contrast ratio.)

In order to build a structure such as shown in FIG. 3, a layer must be formed of a first material having a predetermined susceptibility to a known etchant. Portions of that layer are removed through known techniques such as photolithography and etching. A second material is then formed in the voids of the removed material such as by deposition. This second material has a known susceptibility to the etchant which is different than the first material. The layer is formed of the elongated element material. This structure is etched to form ribbons of the elongated elements. Finally, the second material is removed by etching to form the suspended elongated elements 202. A popular use for light modulators of the type described in the '360 patent is for use as a variable optical attenuator, VOA, for signals in a fiber-optic network.

FIGS. 4A and 4B show how an articulated one-dimensional grating can be used to control the amount of light reflected into an optical fiber. FIG. 4A illustrates a reflective grating 320 in an undeformed state in which an incident light 310 from an optical fiber 305 impinges upon the reflective grating 320. A numerical aperture (NA) of the optical fiber 305 determines an acceptance cone 315 in which the optical fiber 305 accepts light. In its undeformed state, the reflective grating 320 behaves much like a mirror; the incident light 310 is simply reflected back into the optical fiber 305 with no attenuation . FIG. 4B illustrates the reflective grating 320 in a deformed state in which the incident light 310 is diffracted at predominantly predetermined diffraction angles 325. The diffraction angles 325 can be adjusted to be larger than the acceptance cone 315 of the optical fiber 305 thereby allowing attenuation of the incident light 310. By controlling the deformation of the grating, the amount of light reflected back into the fiber can be controlled.

Unfortunately, when arbitrarily polarized light impinges on a linear one-dimensional (1D) grating, each polarization state interacts with the grating differently. Such a scenario is illustrated in FIG. 5 in which an incident light beam 350 impinges upon a 1D grating 360 comprising a series of reflective ribbons placed in parallel. The incident light 350 includes a polarization state P and a polarization state S. Light polarized parallel to the ribbons (polarization state P) interacts with the 1D grating 360 differently than light polarized perpendicular to the ribbons (polarization state S). Polarization states S and P each "see"0 different environments at the 1D grating 360. This can lead to Polarization Dependent Losses (PDL) in which one polarization state is attenuated more than the other. These problems become especially acute as the gap between each adjacent ribbon approaches the wavelength of the incident light.

What is needed is a grating system that treats each polarization state equally. Further, a system is desired that substantially eliminates Polarization Dependent Losses. What is also needed is a variable optical attenuator in fiber optic networks that does not suffer from Polarization Dependent Losses.

SUMMARY OF THE INVENTION

According to embodiments of the present invention, a light modulator performs variable optical attenuation in fiber optic networks without incurring Polarization Dependent Losses. Preferably, the light modulator is a two-dimensional (2D) MEMS (MicroElectroMechanical System) diffraction grating. The 2D diffraction grating modulates an incident beam of light. A plurality of elements each have a reflective surface with their respective reflective surfaces substantially coplanar. Alternatively, the reflective surfaces of the plurality of elements lie within one or more parallel planes. The elements are supported in relation to one another. Preferably, a planar member includes a plurality of holes arranged in a symmetrical two-dimensional array and configured such that the holes substantially optically extend the elements. In an alternative embodiment, one or more elements substantially optically extends the plurality of holes. The planar member includes a light reflective planar surface that is parallel to the plane of the elements within a functional area of the device. The planar member is supported in relation to the elements. By applying an appropriate biasing voltage to the planar member, the planar member can be moved in a direction normal to the plane of the elements. When the planar member and the plurality of elements are in a first configuration, the 2D diffraction grating reflects the incident beam of light as a plane mirror. When the planar member and the plurality of elements are in a second configuration, the 2D diffraction grating diffracts the incident beam of light. Preferably, the planar member is a membrane circumferentially coupled to a support structure.

BRIEF DESCRIPTION OF THE DRAWINGS

FIG. 9 illustrates a cross-sectional view of a portion of the 2D grating according to the preferred embodiment of the present invention.

FIG. 10A illustrates a cross section view of a functional portion of the 2D grating in the non-diffracting/up mode according to the preferred embodiment.

FIG. 10B illustrates a cross section view of a functional portion of the 2D grating in the diffracting/down mode according to the preferred embodiment.

DETAILED DESCRIPTION OF THE EMBODIMENTS

Embodiments of the present invention substantially eliminate PDL by using a light modulator to treat the S and P polarizations symmetrically. Preferably, the light modulator is a 2D MEMS diffraction grating. A preferred embodiment uses conventional grating light valve process technology comprising standard CMOS materials and processes, and $XeF_2$ etchant technology for releasing ribbons of the MEMS structure. A conventional 1D linear-array grating light valve can be used as an optical attenuator. However, because of a low order of symmetry, the 1D linear-array grating light valve suffers from substantial PDL. Embodiments of the present invention incorporate higher degrees of rotational symmetry to substantially eliminate PDL. Embodiments of the present invention can be used as a means for performing variable optical attenuation in fiber optic carriers without incurring PDL. It should be clear to those skilled in the art that the present invention can also be used in other applications in which low PDL is desirable. The specifications on fiber-optic systems are stringent regarding PDL. In a fiber containing multiple wavelengths, where each wavelength represents a different channel, each wavelength can exit the fiber having a different polarization state. It is undesirable to have varying attenuation between the channels because the polarization of each channel is different. In this case, it is desirable to attenuate across the entire spectrum with a flat attenuation profile. Embodiments of the present invention are preferably suited to communications applications using wavelength division multiplexing (WDM) or Dense WDM (DWDM) with multiple wavelengths on a standard grid.

Figure 1:
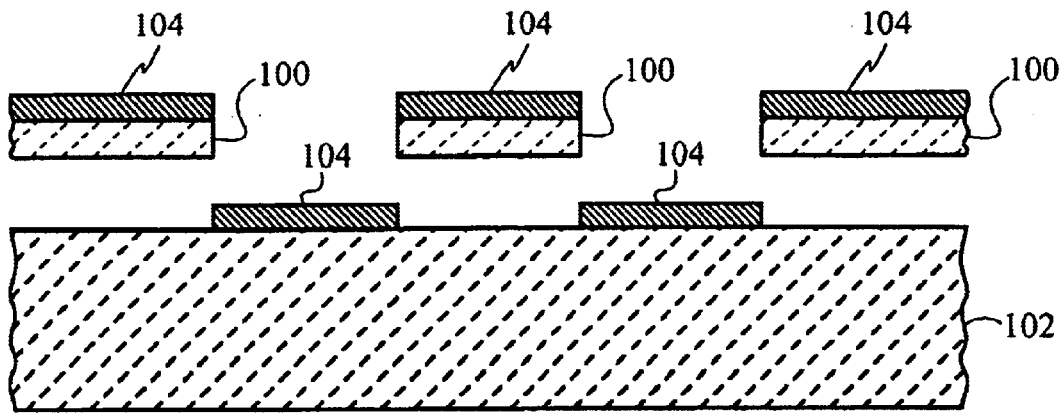
FIG. 1 illustrates a cross section view of a conventional 1D diffraction grating light valve wherein ribbon elements are in an up position.
Figure 2:
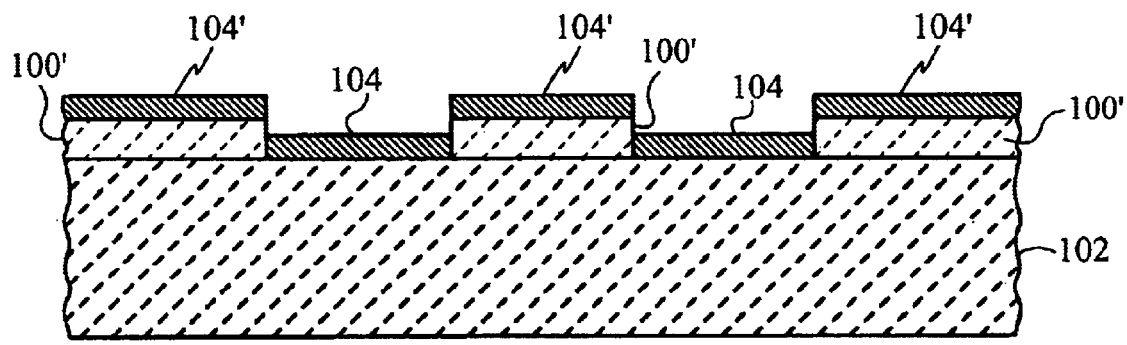
FIG. 2 illustrates a cross section view of the conventional 1D diffraction grating light valve of FIG. 1 wherein the ribbon elements are in a down position.
Figure 3:
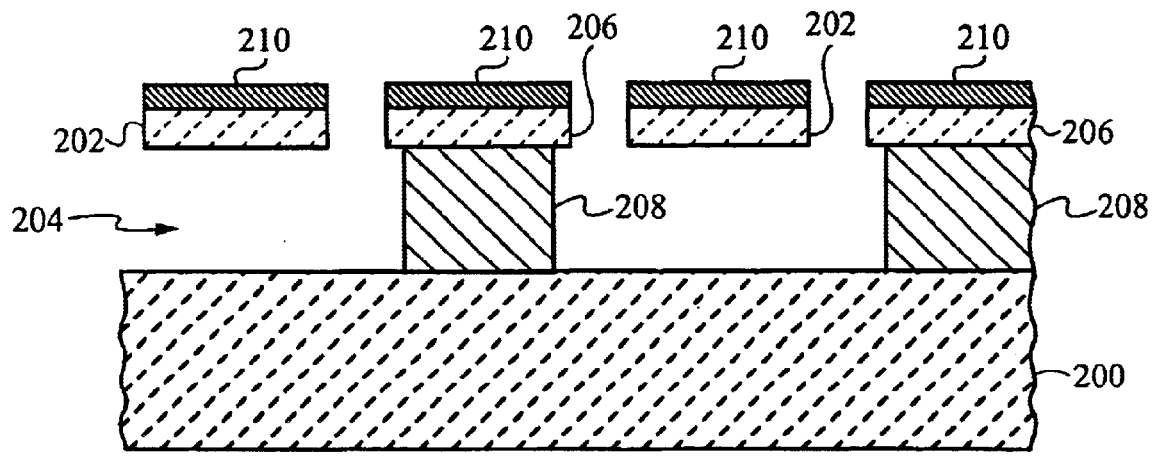
FIG. 3 illustrates a cross section view of an alternate embodiment of a conventional 1D diffraction grating light valve having a plurality of planarly arrayed elongated elements, a portion of which are supported by support members.
Figure 4A:
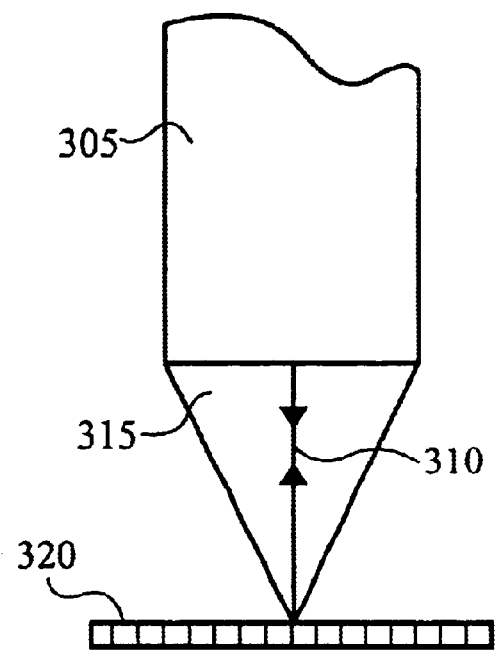
FIG. 4A illustrates a reflective 1D grating in an undeformed state in which an incident light from an optical fiber impinges upon the reflective 1D grating.
Figure 4B:
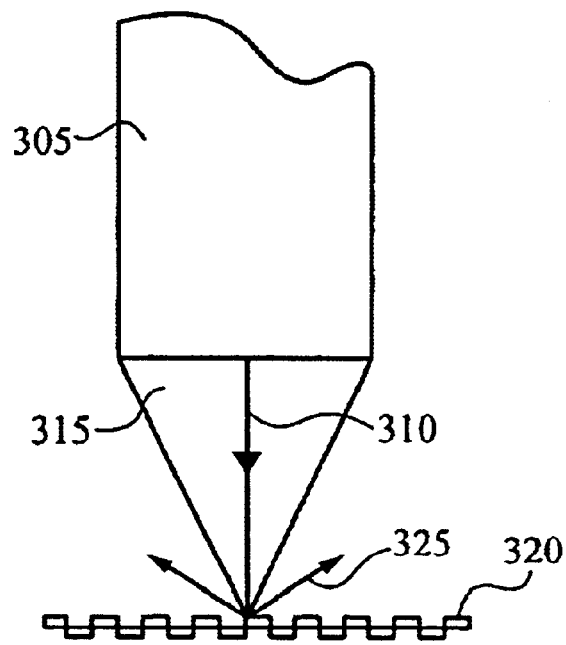
FIG. 4B illustrates the reflective 1D grating in a deformed state in which the incident light is diffracted at predetermined angles.
Figure 5:
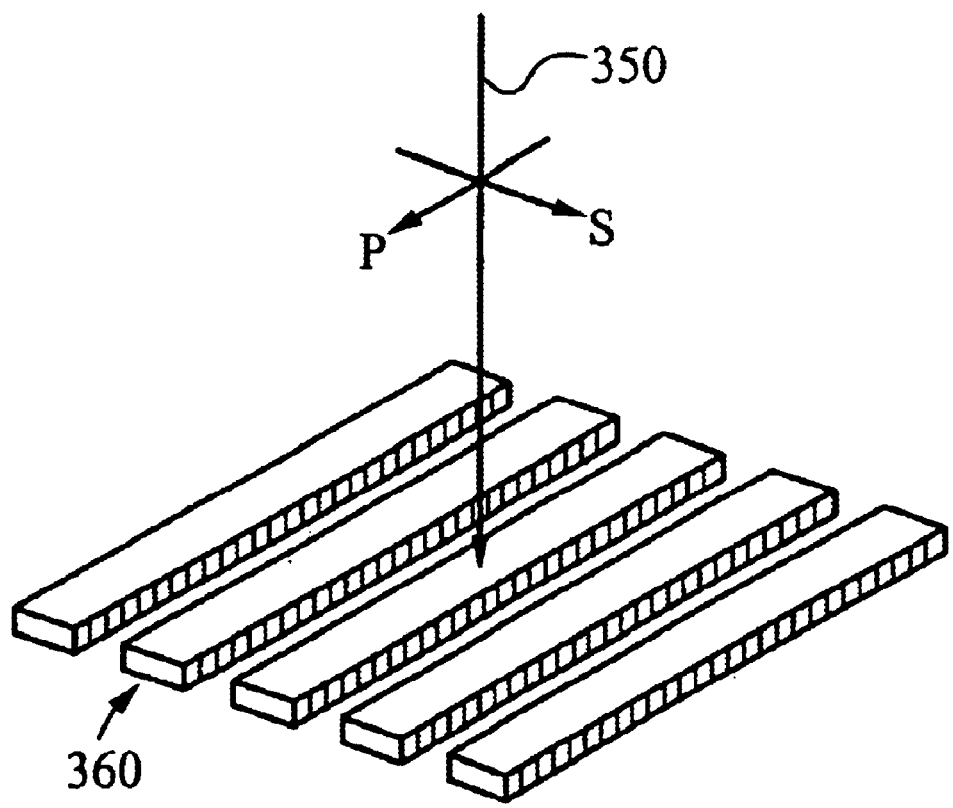
FIG. 5 illustrates an incident light impinging upon a 1D grating comprising a series of reflective ribbons placed in parallel.
Figure 6:
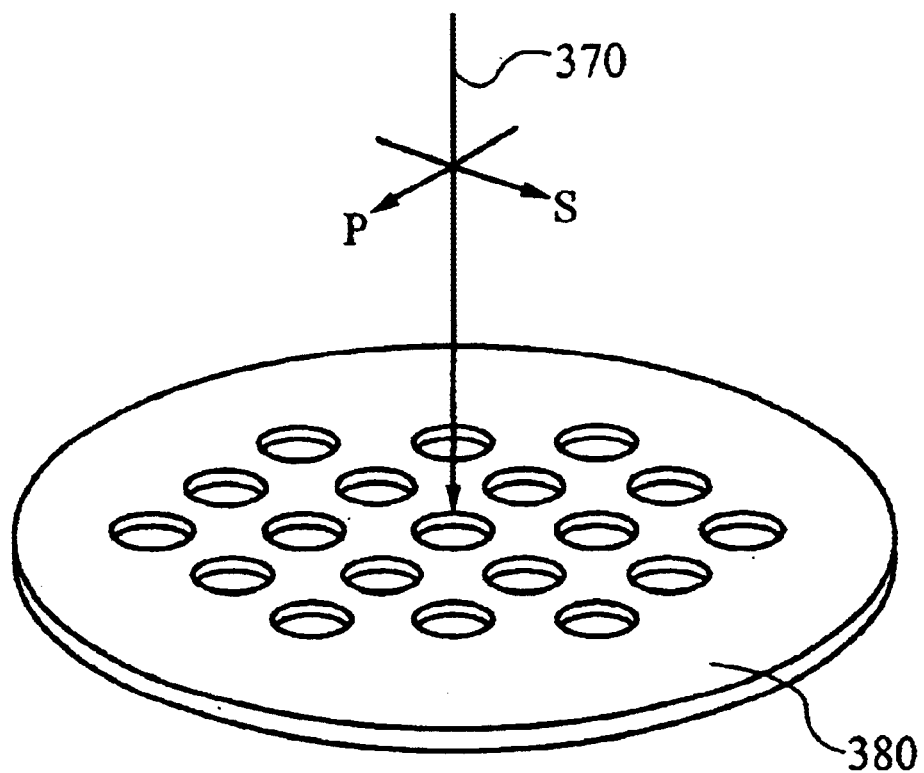
FIG. 6 illustrates an arbitrarily polarized light impinging a conceptualized 2D grating according to the present invention.

FIG. 6 illustrates a two-dimensional grating that substantially eliminates PDL according to embodiments of the present invention. An arbitrarily polarized incident light 370 impinges upon a 2D grating 380. The 2D grating 380 comprises a reflective membrane including a plurality of holes and a plurality of reflective elements (not shown in FIG. 6). Each reflective element resides within one of the plurality of holes of the membrane. The incident light 370 includes a polarization state P and a polarization state S. The polarization states S and P each "see"0 identical environments at the 2D grating 380. Because of its higher order symmetry, the 2D grating 380 treats the polarization states S and P equally, thereby mitigating PDL.

Figure 7:
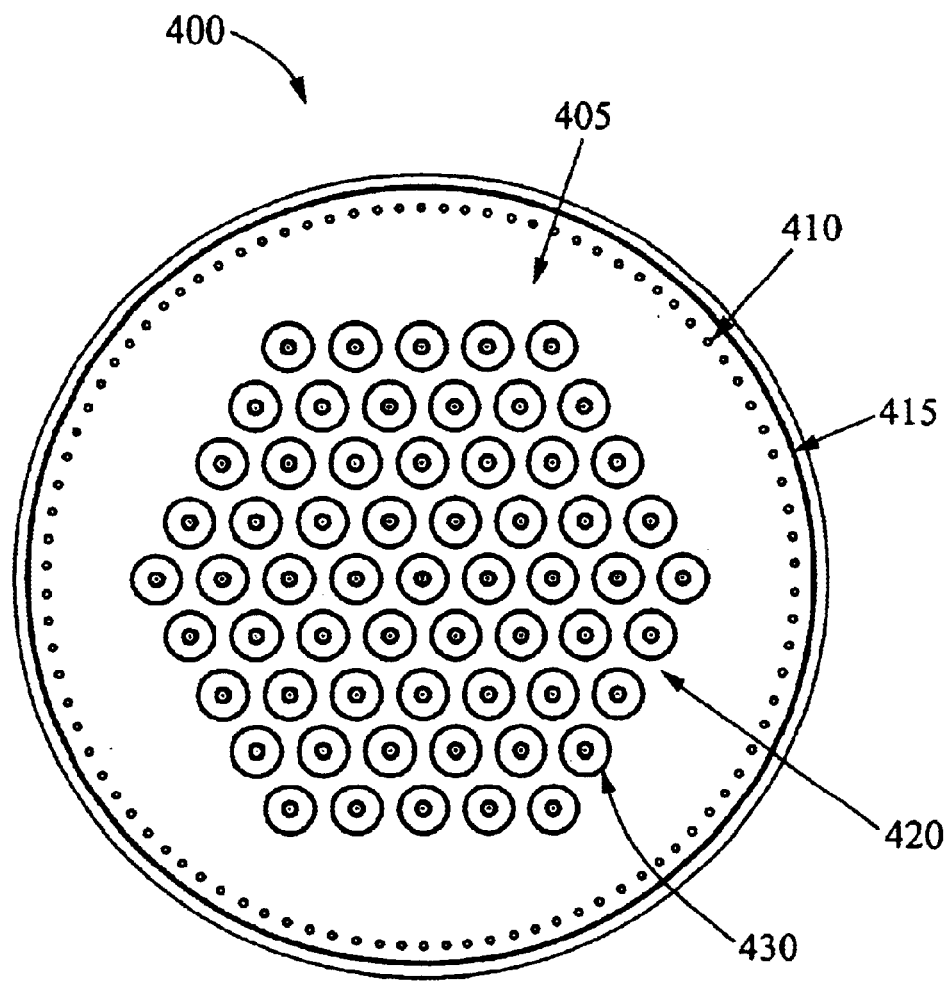
FIG. 7 illustrates a plan view for a 2D grating according to the preferred embodiment of the present invention.

FIG. 7 illustrates a plan view for a 2D grating 400 according to the preferred embodiment of the present invention. Although the 2D grating 400 is preferably configured as a hexagonal array of holes and reflective elements, the 2D grating 400 can be designed as any 2D rotationally symmetric array including, but not limited to, a square and an octagon. The materials, film sequence and processing steps are identical to those for fabricating a linear array grating light valve. A sacrificial layer (sacrificial layer 530 in FIG. 9) lies underneath the 2D grating 400 shown in FIG. 7. Preferably, the sacrificial layer is a poly-silicon. The sacrificial layer is defined by an etched annulus 415. A circular array of etched support posts 410 are located directly inside the annulus 415 to provide a rigid support for a taut silicon-nitride membrane 405. A light reflective material forms the top layer of the membrane 405. A plurality of optical posts 420 are arrayed in the interior of the membrane 405 to form the 2D grating 400. Each of the optical posts 420 are separated from the membrane 405 by a nitride cut 430. To achieve optimum contrast ratio, the diameter and spacing of the optical posts 420 is adjusted such that there is equal area inside and outside the circular nitride cuts 430. This relationship between the area inside and outside the nitride cuts 430 is discussed in detail below in relation to FIG. 8. The optical posts 420 are anchored to the substrate similarly as the etched support posts 410 around the perimeter of the device. In a release step, $XeF_2$ flows into the nitride cuts 430 and removes the sacrificial layer, thereby forming an air gap underneath the membrane 405. This allows the membrane 405 to be deflected with respect to the static optical posts 420, thereby forming the 2D diffraction grating 400. In the preferred embodiment, each of the plurality of holes in the membrane 405 and each of the optical posts 420 are circular to provide symmetrical stress displacement. The circular shapes of the holes and reflective elements in addition to the array symmetry results in identical treatment of both polarization states S and P. It should be clear to those skilled in the art that the holes and reflective elements can be configured as symmetrical shapes other than circles, for example a square, hexagon, or octagon.

Figure 8:
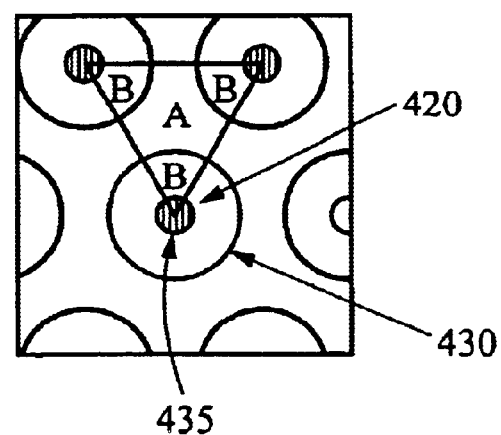
FIG. 8 illustrates a representative section of a functional area of the 2D grating in FIG. 7.

FIG. 8 illustrates a representative section of a functional area of the 2D grating 400. It is a design consideration that the incident light impinges the 2D grating 400 within the functional area. It is also a design consideration to determine a ratio between the surface area of the membrane and the surface area of the reflective elements within the functional area. The surface area of the membrane can be represented by A in FIG. 8, and the surface area of the reflective elements can be represented by B+B+B, or 3B. Neither of the surfaces areas A or B include the surface area of the nitride cuts 430. Also, each optical post 420 includes a center 435 in which incident light is lost. Therefore, section B does not include a portion of the center 435. In the preferred embodiment, the surface area of the membrane is equal to the surface area of the reflective elements such that 3B=A. In this case where the surface areas are equal, the best possible cancellation is achieved, thereby causing the incident light to be diffracted as desired It should be clear to those skilled in the art, that a ratio different than 3B=A can be used to achieve other desired results.

FIG. 9 illustrates a cross-sectional view of a portion of the 2D grating 400 according to the preferred embodiment of the present invention. A preferred manufacturing process is described in relation to the structure illustrated in FIG. 9. FIG. 9 is not to scale. A layer of $SiO_2$ is thermally oxidized onto a silicon wafer to form a $SiO_2$ substrate 510. A bottom electrode 515 is formed on top of the substrate 510. The bottom electrode 515 is preferably comprised of a polysilicon (doped poly) with low resistivity, but can also be another low resistance material. A $SiO_2$ etch stop 520 is then added. The etch stop 520 is resistant to $XeF_2$. A sacrificial layer 530 is formed over the etch stop 520. The sacrificial layer 530 is preferably comprised of titanium nitride. Alternatively, the sacrificial layer 530 is comprised of polysilicon. Holes are then etched into the sacrificial layer 530 for the etched support posts 410 and the optical posts 420. The support posts 410 are preferably smaller in diameter than the optical posts 420. Preferably, each securing post 410 is separated from its neighbor by the diameter of the securing post. In the case where the diameter of the securing post 410 is 2 microns, for example, then spacing between each securing post is 2 microns. In other words, the spacing between the center of each adjacent securing post is 4 microns in this case. As discussed above in relation to FIG. 8, the spacing between each optical post 420 is determined by the designed ratio of the surface area of the membrane to the surface area of the reflective elements within the functional area. In the preferred embodiment, this ratio is one. A silicon nitride, $Si_3N_4$, layer 525 is then added. The $Si_3N_4$ layer 525 is etched to form the nitride cuts 430. An aluminum layer 535 is then added and etched to match the nitride cuts 430 in the $Si_3N_4$ layer 525. $XeF_2$ is then applied through the nitride cuts 430 to remove the sacrificial layer 530. The annulus 415 is formed at the point where the $Si_3N_4$ layer 525 meets the etch stop 520 along the outer rim of the membrane 405. When the $XeF_2$ is released into the nitride cuts 430, the $XeF_2$ progresses to the annulus 415 and stops there. Where the sacrificial layer 530 previously existed, now exists an air gap. The resulting 2D grating 400 includes the etched support posts 410, the membrane 4005 and the optical posts 420. The aluminum layer 535 on the membrane 405 is coupled to a voltage source, and the bottom electrode 515 is coupled to ground or some other voltage source.

It should be clear that the thicknesses illustrated in FIG. 9 related to the $SiO_2$ substrate 510, the bottom electrode 515, the etch stop 520, the sacrificial layer 530, the $Si_3N_4$ layer 525, and the aluminum layer 535 are for illustrative purposes only and are not to scale. Although there is a strong argument that the 2D grating of the present invention yields no PDL, defects in the membrane and the optical posts make those portions polarization sensitive. Therefore, due to imperfections in the device structure, trace amounts of PDL do exist, although they are minimal. Each step in the manufacturing process is a conventional step. Therefore, the process as well as the device according to embodiments of the present invention is CMOS compatible and can integrate CMOS devices onto this device.

In addition to substantially eliminating PDL, the 2D grating according to embodiments of the present invention provides structural advantages over conventional grating light valves utilizing reflective ribbons. The 2D grating remains substantially flat due to biaxial tension. Also, due to the biaxial tension present in the membrane, the present invention can resonate at a higher frequency than a 1D grating light valve. As a result, the 2D grating of the present invention provides a faster VOA as compared to conventional thermally controlled VOAs, or other ribbon grating light valve devices.

In operation, a voltage is applied to the aluminum layer 535 of the membrane 405 while the bottom electrode 515 remains grounded. Preferably, a voltage source (not shown in the figures) is coupled to the membrane 405 and to ground to apply the voltage difference. While in this "on"0 position, the electrical potential between the aluminum layer 535 on the membrane 405 and the bottom electrode 515 produces electrostatic force that causes the membrane 405 to bend towards the etch stop 520. The etched support posts 410 prevent the outer rim of the membrane 405 from collapsing, thereby maintaining tension in the membrane 405. If the etched securing posts 410 were not present, then the outer rim would fold over, or collapse, under the tension of the membrane 405. The etched securing posts 410 do not collapse because there is tension applied from inward tension of the membrane 405 and outward tension of the outer rim. The $Si_3N_4$ layer 5secures very well to the $SiO_2$ etch stop 5thereby providing the outward tension of the outer rim. In the "on"0 position, the membrane 405 is substantially flat in the middle, thereby forming the functional area. The functional area is located within the rotationally symmetric array of holes and reflective elements. The incident light must fall within this functional area. The preferred diameter of the incident light is about 25 microns.

Preferably, a controller is coupled to the voltage source. The controller provides appropriate control signals to the voltage source to control when and by how much the membrane 405 is deflected.

FIG. 10A illustrates a cross section view of a portion of the functional area of the 2D grating 400 in a non-diffracting/up mode according to the preferred embodiment. In the non-diffracting/up mode, no voltage is applied to the membrane 405. As can be seen from FIG. 10A, the optical posts 4are arranged to be coplanar with the membrane 405 and present a flat upper surface which is coated with the aluminum layer 535. In this manner, the 2D grating acts as a plane mirror and it reflects incident light while in the non-diffracting/up mode.

FIG. 10B illustrates a cross section of the portion of the functional area of the 2D grating 400 in a diffracting/down mode according to the preferred embodiment. In the diffracting/down mode, a voltage is applied to the membrane 405. The amount of voltage is determined by the restoring force associated with the membrane 405 and the distance $\lambda/4$ that the membrane is to be moved down, where $\lambda$ is the wavelength of the incident light impinging the 2D grating 400. The voltage must be sufficient to overcome the restoring force of the membrane 405 and pull the planar surface of the membrane 405 to a distance $\lambda/4$ below the planar surface of the optical post 420. In this manner, the reflected light from the surface of the membrane 405 will be completely out of phase with the reflected light from the surface of the optical posts 420. This will cause the 2D grating 400 to diffract the light. When the applied voltage is removed from the membrane 405, restoring forces resulting from the biaxial tension of the membrane 405 return the membrane 405 to the non-diffracting/up mode as illustrated in FIG. 10A. Accordingly, within the functional area of the 2D grating 400, when the planar surface of the optical posts 420 and the planar surface of the membrane 405 are separated by a distance equal to about m/4 times a particular wavelength of the incident light, the 2D grating 400 acts as a plane mirror when m=an even whole number or zero and as a diffracting 2D grating when m=an odd whole number.

In the preferred embodiment where the holes in the membrane 405 and the optical posts 420 are circular, while in the diffracting mode, the light is diffracted as six light beams. Preferably, these six diffracted light beams are equally spaced along a perimeter of a cone. Each diffracted light beam can be collected. In this manner, embodiments of the 2D grating of the present invention can be used as a switch where each collected diffracted light beam is an output port of the switch. Similarly, the 2D grating can be used to uniformly adjust the intensity of the diffracted light beams. By moving the membrane 405 a distance between 0 and $\lambda/4$, the incident light is variably reflected such that a portion of the incident light is reflected and a remaining portion of the incident light is diffracted. In this manner, diffracted light can be attenuated by reflecting a portion of the light back into an input fiber of the incident light. A circulator or isolator can be used to block this reflected portion, while the attenuated diffracted light is collected as output.

It is understood that although the preferred embodiment includes the plurality of holes and corresponding plurality of reflective elements to be configured in a symmetric array, the plurality of holes and corresponding reflective elements can be configured as a randomized array.

In another alternative embodiment, an array of 2D gratings can be used as a dynamic band equalizer. As discussed above, fiber-optics typically carry a multiplicity of channels where each channel constitutes a different wavelength of the light transmitted within the fiber. In this alternate embodiment, an optical train isolates each channel and directs each channel as normal incident light to one of the array of 2D gratings. Each channel is tightly banded within a narrow band. Each 2D grating is tuned to equalize a specific channel. The 2D grating is tuned by adjusting the applied voltage to deform the membrane the necessary distance $\lambda/4$, where $\lambda$ is the wavelength of the specific channel to be equalized.

In a further alternative embodiment, PDL can be minimized in a conventional 1D grating light valve by including a symmetrical array of holes into each ribbon and placing optical posts within each of the holes.

To this point, the 2D grating of the present invention has been described in terms of an incident light impinging normal to the 2D grating. Polarization sensitivity also results from incident light impinging a surface at some angle other than normal incidence. As such, a 2D grating according to the present invention can be designed that builds in polarization dependence to compensate for the angle of light incidence. To illustrate, in the preferred embodiment, the 2D grating provides for polarization independence when incident light normally impinges the circular optical posts and the membrane with circular holes. If the angle of incident light is not normal, a 2D grating can be constructed to offset this non-normal angle of incidence by making the holes and optical posts elliptical instead of circular. Therefore, the 2D grating can be designed to substantially eliminate PDL for any angle of light incidence.

It will be readily apparent to one skilled in the art that other various modifications may be made to the preferred embodiment without departing from the spirit and scope of the invention as defined by the appended claims. For example, the membrane is described as moving in relation to fixed optical posts; however, the same diffracting effect can be obtained by replacing the optical posts with a reflective layer resting directly on the etch stop and below the planar surface of the membrane. In general, the optical posts can lie in any plane that is m(λ/2) above or below the planar surface of the membrane, where m is an integer. This reflective layer can be a single reflective element or a plurality of reflective elements. In the case of a plurality of reflective elements, the size of each reflective element can either be greater than, equal to or less than the size of each of the plurality of holes in the membrane, depending on the particular design considerations.

Also, the functional area of the membrane can be increased by depositing a thick film on the center such that the membrane bends more towards the outer rim and less so in the center.

Further, instead of a membrane and a support structure that circumferentially couples the membrane to the substrate, a planar member replaces the membrane in an alternative embodiment. In this case, the planar member is coupled to the substrate at either or both ends of the planar member. Alternatively, the planar member is circumferentially coupled to the substrate. In a specific alternative embodiment, the planar member is an elongated ribbon including a plurality of holes, where the elongated ribbon is coupled to the substrate at either or both ends of the ribbon.

We claim:

1. A modulator for modulating an incident beam of light comprising:
   a. a plurality of elements, each element including a light reflective planar surface with the light reflective surfaces of the plurality of elements lying in one or more parallel planes;
   b. a substantially planar member including a plurality of holes, wherein the holes are positioned such that the plurality of holes substantially optically extend the plurality of elements, the planar member including a light reflective planar surface parallel to the one or more parallel planes of the plurality of elements within a functional area of the modulator; and
   c. a support structure coupled to the plurality of elements and to the planar member to maintain a position of the planar member in relation to the plurality of elements and to enable movement of the planar member in a direction normal to the plane of the plurality of elements, and between a first modulator configuration wherein the planar member and the plurality of elements act to reflect the incident beam of light as a plane mirror, and a second modulator configuration wherein the planar member and the plurality of elements act to diffract the incident beam of light.

2. The modulator according to claim 1 wherein a surface area of the planar member and a surface area of the plurality of elements forms a predetermined ratio within the functional area of the modulator.

3. The modulator according to claim 2 wherein the predetermined ratio includes equal surface area of the plurality of elements and surface area of the planar member within the functional area of the modulator.

4. The modulator according to claim 1 wherein the one or more parallel planes of the plurality of elements and the planar surface of the planar member lie within planes separated by a distance equal to about m/4 times a particular wavelength of the incident beam of light within the functional area of the modulator, wherein m=an even whole number or zero when the modulator is in the first modulator configuration and m=an odd whole number when the modulator is in the second modulator configuration.

5. The modulator according to claim 1 further comprising means for applying an electrostatic force to the planar member to move the planar member in the direction normal to the one or more parallel planes of the plurality of elements.

6. The modulator according to claim 5 wherein the reflective surfaces of the plurality of elements and the reflective surface of the planar member are formed by metallic layers deposited on upper surfaces of the plurality of elements and the planar member.

7. The modulator according to claim 6 wherein the means for applying electrostatic force includes a voltage supply coupled to the metallic layer of the planar member for applying a bias voltage to the planar member.

8. The modulator according to claim 1 wherein the planar member is formed of a deformable resilient material.

9. The modulator according to claim 1 wherein the number of holes in the planar member is equal to the number of elements.

10. The modulator according to claim 9 wherein a shape of the holes is the same as a shape of the elements and an area of the holes is larger than an area of the elements.

11. The modulator according to claim 10 wherein the shape of the holes and the shape of the elements substantially eliminates polarization dependent losses of the incident beam impinging on the modulator.

12. The modulator according to claim 10 wherein the shape of the holes and the elements is circular.

13. The modulator according to claim 10 wherein the incident light does not impinge normal to the one or more parallel planes, and the shape of the holes and the elements is elliptical.

14. The modulator according to claim 1 wherein the holes are arranged in a symmetrical two-dimensional array.

15. The modulator according to claim 14 wherein the two-dimensional array forms a square.

16. The modulator according to claim 14 wherein the two-dimensional array forms a hexagon.

17. The modulator according to claim 1 wherein the planar member is a membrane circumferentially coupled to the support structure.

18. The modulator according to claim 17 wherein the support structure includes a circular array of etched posts for circumferentially coupling the support structure to the membrane, wherein the plurality of elements are positioned within the circular array of posts.

19. A method of modulating an incident beam of light comprising:
   a. causing the beam to impinge upon a plurality of elements, each element including a light reflective planar surface with the light reflective surfaces of the plurality of elements lying in one or more parallel planes, and to impinge upon a substantially planar member including a plurality of holes, wherein the holes are positioned such that the plurality of holes substantially optically extend the plurality of elements, the planar member including a light reflective planar surface parallel to the one or more parallel planes of the plurality of elements within a functional area of the modulator; and
   b. moving the planar member in a direction normal to the one or more parallel planes of the plurality of elements, and between a first modulator configuration wherein the planar member and the plurality of elements act to reflect the incident beam of light as a plane mirror, and a second modulator configuration wherein the planar member and the plurality of elements diffract the incident beam of light.

20. A modulator for modulating an incident beam of light comprising:

a. means for causing the beam to impinge upon a plurality of elements, each element including a light reflective planar surface with the light reflective surfaces of the plurality of elements lying in one or more parallel planes, and to impinge upon a substantially planar member including a plurality of holes, wherein the holes are positioned such that the plurality of holes substantially optically extend the plurality of elements, the planar member including a light reflective planar surface parallel to the one or more parallel planes of the plurality of elements within a functional area of the modulator; and b. means for moving the planar member in a direction normal to the one or more parallel planes of the plurality of elements, and between a first modulator configuration wherein the planar member and the plurality of elements act to reflect the incident beam of light as a plane mirror, and a second modulator configuration wherein the planar member and the plurality of elements diffract the incident beam of light.

* * * * *